United States Patent Office 3,659,022
Patented Apr. 25, 1972

3,659,022
METHODS OF PREVENTING IMPREGNATION
Gilbert A. Youngdale and Ronald J. Ericsson, Kalamazoo, Mich., assignors to The Upjohn Company, Kalamazoo, Mich.
No Drawing. Continuation-in-part of application Ser. No. 682,609, Nov. 13, 1967. This application Oct. 3, 1968, Ser. No. 764,914
Int. Cl. A61k 27/00
U.S. Cl. 424—343     5 Claims

ABSTRACT OF THE DISCLOSURE

Pharmaceutical preparations in dosage forms consisting essentially of compatible pharmaceutically acceptable carriers, oral and injectable, compounded with an effective amount for preventing impregnation by sexually mature male animals, of a compound of the formula

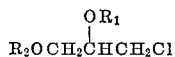

wherein $R_1$ is hydrogen or an acyl radical of a hydrocarbon carboxylic acid of 1 to 18 carbon atoms, inclusive, and $R_2$ is selected from the group consisting of hydrogen, an acyl radical of a hydrocarbon carboxylic acid of 1 to 18 carbon atoms, inclusive, an alkyl radical of 1 to 16 carbon atoms, inclusive, an alkenyl radical of 3 to 16 carbon atoms, inclusive, and an alkynyl radical of 3 to 16 carbon atoms, inclusive. Methods of preventing impregnation by male animals which comprise administering systemically to sexually mature male animals an effective amount of preventing impregnation of a compound as described, suitably compounded into a dosage form of a pharmaceutical preparation.

CROSS REFERENCE

This application is a continuation-in-part of our copending application, Ser. No. 682,609, filed Nov. 13, 1967, now abandoned.

BRIEF SUMMARY OF THE INVENTION

This invention relates to pharmaceutical preparations and methods of use thereof. The pharmaceutical preparations are compounded with oral and injectable carriers to prepare capsules, both hard and soft, elixirs, emulsions, solutions, suspensions, syrups and injectables. The preparations contain an effective amount of the essential active ingredient as heretofore described for bringing about antifertility action in the animals, for example, monkeys, rats, hamsters and guinea pigs.

DETAILED DESCRIPTION

The pharmaceutical preparations are compounded along with suitable oral and injectable carriers to prepare the aforesaid dosage forms. The capsules for oral use are hard gelatin capsules or soft gelatin capsules, containing the active ingredient alone or admixed with an edible oily medium, for example, cottonseed oil, peanut oil, and mineral oil. Elixirs and syrups are formulated with suitable sweetening agents, for example saccharin, cyclomate and sucrose, and diluents such as ethanol, glycerol and sorbitol. They may contain a demulcent and are preferably flavored and colored to provide orally acceptable preparations. Advantageously they contain a suitable preservative such as methyl- or propylparaben. Emulsions suitable for oral use are of both the oil and water types. Also, the essential active ingredient may be in the form of a water-insoluble liquid which is dispersed in the emulsion bases. The emulsions contain emulsifying agents such as acacia and tragacanth and surfactants, for example polysorbate 80 and poloxalkol. Solutions of the water-soluble compounds are prepared by simple admixture with water which advantageously contains a preservative such as methyl- or propylparaben. Oil dispersions contain the essential active ingredient and may include a demulcent, for example carboxymethylcellulose, alginate, polyvinylpyrrolidone, along with a dispersing agent such as lecithin. The dispersions also contain suitable preservatives, for example propylparaben. Dosage forms for injectable use are sterile solutions, the pure compound in sterile form, and sterile emulsions. Such preparations for injectable use must be sterile and must contain bacteriostatic and preservative agents, according to the art.

Any specific form for dosing the male animals, such as monkeys, rats, guinea pigs and hamsters, contains an effective amount for antifertility action of a compound of the formula

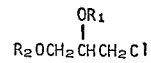

wherein $R_1$ is hydrogen or an acyl radical of a hydrocarbon carboxylic acid of 1 to 18 carbon atoms, inclusive, and $R_2$ is selected from the group consisting of hydrogen, an acyl radical of a hydrocarbon carboxylic acid of 1 to 18 carbon atoms, inclusive, an alkyl radical of 1 to 16 carbon atoms, inclusive, an alkenyl radical of 3 to 16 carbon atoms, inclusive, and an alkynyl radical of 3 to 16 carbon atoms, inclusive.

The compound of the foregoing formula in which each of $R_1$ and $R_2$ is hydrogen is a diol, namely, 3-chloro-1,2-propanediol.

The general procedure for the preparation of the compounds which are ether-secondary alcohols comprises reaction of an alcohol with epichlorohydrin with or without the presence of an acid catalyst. The acid catalyst is aluminum chloride, stannic chloride, boron trifluoride, sulphuric acid, boric acid, phosphoric acid, or other strong acid.

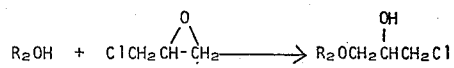

In this equation $R_2$ is alkyl, alkenyl or alkynyl as defined above.

The preparation of esters is well known in the art. For example, an ether-secondary alcohol is reacted with an acid anhydride or an acid halide, e.g. bromide or chloride.

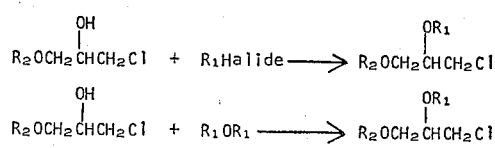

In these equations $R_2$ is alkyl, alkenyl or alkynyl as defined above and $R_1$ is acyl of 2 to 18 carbon atoms, inclusive. Those esters in which $R_1$ is formyl can be prepared by reacting the aforesaid ether-secondary alcohol with formic acetic anhydride.

For the preparation of esters of primary alcohols, a carboxylic acid is reacted with epichlorohydrin.

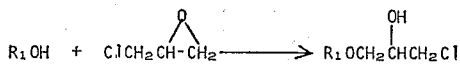

In this equation $R_1$ is acyl as defined above.

For di-esters this product is reacted with an acid anhydride or acid halide, e.g. bromide or chloride.

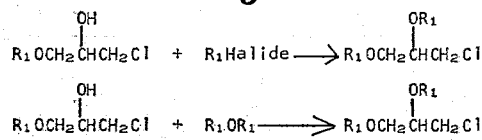

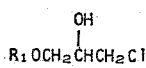

In these equations $R_1$ is acyl of 2 to 18 carbon atoms, inclusive. The free hydroxyl group of the above primary alcohol esters of the formula $$R_1OCH_2\overset{OH}{C}HCH_2Cl$$

can be formylated by reacting the ester of the primary alcohol with formic acetic anhydride. The acyl moieties in the di-ester product can be the same or different, depending on the particular reactants employed.

Di-esters can also be prepared by reacting 3-chloro-1,2-propanediol with an acid anhydride $R_1OH_1$ or an acid halide $R_1$Halide in which $R_1$ is acyl of 2 to 18 carbon atoms, inclusive, or with formic acetic anhydride.

The compounds are purified by distillation or column chromatography on silica gel or by a combination of both. Many of the compounds, intermediates and representative members thereof are known in the chemical and patent literature. The others can be prepared in accordance with known procedures.

The aforesaid alkyl groups of 1 to 16 carbon atoms, inclusive, are for example methyl, ethyl, propyl, isopropyl, butyl, tertiary butyl, pentyl, 2-methylbutyl, hexyl, heptyl, octyl (1 to 8 carbon atoms), tetradecyl, pentadecyl, cetyl, and the others within the group as known in the art. The acyl radicals of a hydrocarbon carboxylic acid of 1 to 18 carbon atoms, inclusive, are for example acetyl, propionyl, butyryl, isobutyryl, valeryl, isovaleryl, caproyl (2 to 6 carbon atoms), decanoyl, undecanoyl, lauroyl (2 to 12 carbon atoms), formyl, hexadecanoyl, heptadecanoyl and stearoyl, the others within the group as known in the art, and acryloyl and benzoyl. Akenyl radicals of 3 to 16 carbon atoms, inclusive, are for example allyl, butenyl, pentenyl, tetradecenyl, pentadecenyl, hexadecenyl and the others within the group as known in the art. Alkynyl radicals of 3 to 16 carbon atoms, inclusive, are for example propargyl, butynyl, pentynyl, tetradecynyl, pentadecynyl, hexadecynyl, and the others within the group as known in the art.

Oral dosage forms, as heretofore described, contain from about 0.25 to about 2.5 gm. of the essential active ingredient per unit dose, but are not limited thereto, since within such range they include, for example, 0.5 gm., 1 gm., and 2 gm. Sterile liquid forms for injectable administration contain from about 25% to 100% of the essential active ingredient but are not limited thereto, since they include within this range, for example 30%, 40%, and 60%. Liquid oral dosage forms contain from about 5% to 100% of the essential active ingredient but are not limited thereto, since within this range are included, for example 10%, 15%, 50% and 75%. These dosage forms provide, generally, a dosage range of essential active ingredient from about 0.25 to about 2.5 gm. per day. The daily oral and parenteral doses are approximately the same except for sustained parenteral dosage forms which contain from about 0.25 gm. to about 1 gm. of essential active ingredient per ml. and are given once a month intramuscularly. The usual oral and parenteral forms are to be administered once per day. Other ingredients, which are however not essential to the present invention, are, for example, a progestational agent such as medroxyprogesterone or melengestrol acetate, given in the usual dosage regime for such active ingredient.

Mature virgin male rats are checked for ability to mate by placement with mature female rats primed with gonadotropic factor of pregnant mare's serum. Those males which mate are used for subcutaneous injection or oral administration of the novel pharmaceutical preparations. The essential active ingredient is prepared as a 30 mg./ml. dispersion in 0.25% aqueous methylcellulose in sterile vehicle. This pharmaceutical composition is administered to each of three mature mating males, a half ml. per day subcutaneously or orally for eight days. These treated males are exposed to receptive mature females for mating and mating is checked by the presence of sperm with or without a plug in the vagina of the female. Approximately ten days thereafter, the females are examined for the presence and number of implantation sites, and the ability of the pharmaceutical compositions to prevent impregnation by the mature male is shown by the absence of implantation sites at autopsy.

The following examples illustrate the manner and process of making and using the invention but are not to be construed as limiting.

EXAMPLE 1

3-chloro-1,2-propanediol was prepared as a 3% sterile solution in 0.25% aqueous methylcellulose. One-half ml. was injected subcutaneously into each of three mating male rats for eight days. Thereafter, the treated males were subjected to the aforesaid procedure to determine the ability of the preparation to prevent impregnation by the males, and the preparation was found to be effective.

EXAMPLE 2

The isopropyl ether of 3-chloro-1,2-propanediol (i.e., 1-chloro-3-isopropoxy-2-propanol) was made up into a pharmaceutical preparation which was tested according to procedures given heretofore and found capable of preventing impregnation by the male.

EXAMPLE 3

The pentyl ether of 3-chloro-1,2-propanediol (i.e., 1-chloro-3-pentyloxy-2-propanol) was sterile filtered and the preparation was administered as in the previous test and examples and found to be active in effectively preventing impregnation by the mature males. Likewise, the 1-acetate ester of 3-chloro-1,2-propanediol was effective in preventing the impregnation.

EXAMPLE 4

The 1-benzoate ester of 3-chloro-1,2-propanediol in the form of a pharmaceutical preparation, 3% in the sterile methyl cellulose solution, also provided an oral pharmaceutical preparation effective in preventing implantation.

EXAMPLE 5

An oral pharmaceutical preparation containing 1% of 3-chloro-1,2-propanediol in 0.25% aqueous methyl cellulose was administered orally to mating mature male rats daily for seven weeks at a daily dose of 5 mg. per rat. This preparation induced inability in the males to impregnate receptive females by the first week, and this infertility remained throughout the treatment. Post-treatment, the ability to impregnate receptive females returned the first week of post-treatment and bred females had a normal number of implantation sites.

EXAMPLE 6

A sterile aqueous solution for injectable use is prepared to contain 250 mg./ml. of 3-chloro-1,2-propanediol. The injection of 1 ml. per day is effective to prevent impregnation of receptive female monkeys by a mature male. Ability to impregnate returns during the first week after cessation of treatment.

EXAMPLE 7

Cottonseed oil is used as sterile vehicle to prepare a sterile solution of allyl ether of 3-chloro-1,2-propanediol (i.e., 1-chloro-3-allyloxy-2-propanol), 30 mg./ml. Injection of 1 ml. daily to sexually mature male rats is effective in preventing impregnation as a result of successful mating.

EXAMPLE 8

Cottonseed oil is used as sterile vehicle to prepare a sterile solution of propargyl ether of 3-chloro-1,2-propanediol (i.e., 1-chloro-3-propargyloxy-2-propanol), 30 mg./ml. Injection of 1 ml. daily to sexually mature male rats is effective in preventing impregnation as a result of successful mating.

Additional embodiments of the present inventive concept are compositions, i.e. rations, for oral ingestion by rodents, especially rats, and methods of controlling rodent population, especially the rat population. Such rations contain the essential active ingredient and, in amounts that are attractive to the animals in the sense that they are not repelled thereby, edible dietary constituents such as protein, fat, carbohydrate, minerals, and vitamins.

The medicated ration must not repel the rodents although it does not necessarily have to attract in the sense of being absolutely preferred over other rations. Hence, the medicated ration retains the natural flavor of the dietary constituents after the essential active ingredient is incorporated therein. Such incorporation provides a final mixture or blend throughout which the active ingredient is uniformly distributed. Such active ingredient can be added to the ration by mixing both as solids or as liquids, by addition to a solid ration of a solution or suspension in water or ethanol; by adding the active ingredient in a liquid which is then removed to leave a dry solid mixture, for example, a solution or suspension in water or ethanol; by adding the active ingredient in the form of coated particles or pellets, coated, for example, by coacervation with gelatin, or by coating with an alcohol solution of a water-soluble type of ethyl cellulose. The final ration containing the coated particles or pellets is the preferred form because of its tendency to better mask any undesirable taste of the essential active ingredient. The rations contain the essential active ingredient in a concentration sufficient to cause lesions in the excurrent duct (epididymal lesions) and permanent infertility in otherwise fertile male animals, especially rats, when they ingest the compositions in their usual manner of providing for their metabolic needs. Illustratively, most mature male rats that ingest an amount of the ration providing at least about 35 mg. per kilogram of rat body weight become irreversibly infertile as shown by epididymal lesions and by sterile matings with fertile females. As will be apparent, rats eating ad libitum will consume different amounts of the active ingredient-containing rations. Hence, to provide about 35 mg. per kilogram in a rat eating a smaller amount of the effective ration, a more concentrated ration must be provided than for a rat consuming a larger amount of the same ration. In the latter case, a less concentrated ration is operable. For example, in rats weighing about 200 to 250 gm. and consuming about 10 to 25 gm. of ration at one feeding, the ration may contain 0.1% by weight of the active ingredient. Thereby, the 250 gm. rat consuming 10 gm. of the treated edible preparation ingests 10 mg. of the active ingredient equivalent to about 40 mg. per kilo. With this same ration containing 0.1% active ingredient, a 200 gm. rat eating 25 gm. at one feeding ingests 25 mg. of the active ingredient, equivalent to about 125 mg. per kilo. Such variations will occur due to the eating habits of the rats. Hence, various embodiments of the rodent-control preparations are within the inventive concept provided they contain an effective amount of the essential active ingredient to cause the males to acquire the epididymal lesions of infertility.

The aforesaid embodiments of this inventive concept provide a method of controlling fertility of male rodents, especially rats, which consists essentially of providing in locales available to and frequently by said male rodents rations supplying an effective amount of a compound of the formula

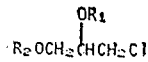

wherein $R_1$ is hydrogen or an acyl radical of a hydrocarbon carboxylic acid of 1 to 18 carbon atoms, inclusive, and $R_2$ is selected from the group consisting of hydrogen, an acyl radical of a hydrocarbon carboxylic acid of 1 to 18 carbon atoms, inclusive, an alkyl radical of 1 to 16 carbon atoms, inclusive, an alkenyl radical of 3 to 16 carbon atoms, inclusive, and an alkynyl radical of 3 to 16 carbon atoms, inclusive, for preventing impregnation of receptive sexually mature female rodents by the male counterparts thereof. Preferably, the rations supply to the recipient at least about 35 mg./kilogram of body weight thereof. At this level most rats acquire irreversible infertility and a reduction in rat population ensues in time. Expressed as percentage by weight of the edible composition, the active ingredient amounts to from about 0.05% to about 0.5%, such range being not limited thereto for it includes within the range the other percentages such as 0.1%, 0.2%, 0.3%, and 0.4%. A more concentrated preparation, say up to about 1% or even 5%, is satisfactory provided it is, upon use, diluted with the aforesaid edible dietary constituents to provide operative amounts of the essential active ingredient without wasting active material. These embodiments of the inventive concept are made available to the animals, especially rats, for control of the population thereof by placing the preparation in and about the locales available to and frequented by the rodents.

In accordance with these and other embodiments of the inventive concept, the following are additional examples of the manner and process of making and using the invention but are not to be construed as limitations.

EXAMPLE 9

Rat ration and method

An animal ration containing carbohydrate, fat, minerals, protein and vitamins is shaped into cubes weighing about 6 gm. each by the addition of a sufficient amount of water to provide 0.8 ml. per cube. To prepare medicated cubes the water contains a sufficient amount of 3-chloro-1,2-propanediol so that each cube contains 35 mg. Adult male rats weighing 350–450 gm. are taken off their regular ration one day prior to the experiment and are used in two different groups. In Group 1, each of ten male rats receives two control cubes not containing 35 mg. of the active ingredient. Ten days after feeding the uneaten food is weighed to determine the amount of ration consumed and mg. dose of active ingredient and the rats are returned to their normal diet. Five days post-treatment the male rats are sacrificed and examined for epididymal lesions. The results are as follows:

| Group | Number rats | Number cubes | Average ration consumed, grams | Average milligrams dose | Lesions |
|---|---|---|---|---|---|
| Group I control ration. | 10 | 2 each. | 12 | None | None. |
| Group II medicated ration. | 10 | 2 each. | 7.5 | 43.8 | 8 of 10 rats. |

EXAMPLE 10

The same general procedure is used as in Example 9 with exception that the supplied amount of ration is increased and the amount of the same active ingredient in each cube is only 12 mg. instead of the 35 mg. of Example 12. The results are as follows:

| Groups | Number of 6 gram cubes | Number of rats | Average body weight, grams | Average ration consumed, grams | Epididymal lesions |
|---|---|---|---|---|---|
| Control I ration | 4 | 7 | 418 | 24 | None |
| Control II ration plus treated ration. | 2 each | 7 | 444 | 17.6 | 5/7 |

EXAMPLE 11

Another animal ration with different sources of the carbohydrate, fat, minerals, protein and vitamins is used as bait. On the day before treatment with the medicated ration, each rat is given seven unmedicated cubes of the ration. In this example, each of the treated cubes (2.23 gm. each) contains 8 mg. of the 3-chloro-1,2-propanediol. Each animal is given ten cubes (5 control and 5 treated) for a total of available ration per rat of 22.3 gm. The rations are available for one night only and on the following morning the uneaten food is weighed. Three days post-treatment the male rats are sacrificed and examined for epididymal lesions. The results are as follows:

| No.[1] | No. of cubes | Total weight of ration | Rat No. | Weight consumed (grams) | Epididymal lesions |
|---|---|---|---|---|---|
| 7 | 5 treated plus 5 untreated | 22.3 grams per rat. | 1 | 13.9 | None. |
| | | | 2 | 11.1 | Yes.[2] |
| | | | 3 | 16.0 | Yes. |
| | | | 4 | 20.0 | Yes. |

[1] Cubes consumed pre-treatment.
[2] Lesion on right side only—left side normal.

EXAMPLE 12

The rats used in this experiment are first fed cubes of untreated ration, ten cubes each for two days prior to the beginning of the treatment. For treatment each animal receives 5 cubes of medicated ration, each 2.26 gm., containing 8 mg. per cube of the active ingredient (3-chloro-1,2-propanediol) and 5 control ration cubes of rat chow. On the day following treatment, the amount of uneaten food is determined in addition to the weights of both the treated ration and the rat chow. Five days post-treatment the male rats are sacrificed and examined for epididymal lesions. The results are as follows:

| Rat No. | Food supplied | Food consumed | Milligram/kilo active ingredient | Epididymal lesions |
|---|---|---|---|---|
| 1 | 5 medicated cubes, 5 cubes chow. | 4.4 grams, 4 cubes. | 38.5 | Yes. |
| 2 | 5 medicated cubes, 5 cubes chow. | 4.6 grams, 5 cubes. | 40.2 | Yes.[1] |
| 3 | 5 medicated cubes, 5 cubes chow. | 8.9 grams, 1.5 cubes. | 77.9 | Yes. |

[1] On one side only.

EXAMPLE 13

*Aqueous preparations and method*

Four groups of three each, mature male Spartan rats, are treated by gavage with an aqueous preparation providing various dosages of 3-chloro-1,2-propanediol to determine effects of the various dosage per rat.

One oral dosage is administered by gavage. Ten days thereafter each rat is sacrificed, weighed, and examined for presence of epididymal lesions.

| Rat weight | Dosage per rat, milligrams | Dosage per kilo, milligrams | Results of examination |
|---|---|---|---|
| Grams: | | | |
| 375 | 10 | 27 | Lesions are not present. |
| 338 | 10 | 30 | Do. |
| 352 | 10 | 28 | Do. |
| 350 | 15 | 42 | Lesions are present, both sides. |
| 366 | 15 | 41 | Do. |
| 318 | 15 | 47 | Do. |
| 367 | 20 | 54 | Do. |
| 351 | 20 | 56 | Do. |
| 356 | 20 | 56 | Do. |
| 360 | 30 | 84 | Do. |
| 358 | 30 | 84 | Do. |
| 358 | 30 | 84 | Do. |

EXAMPLE 14

*Solid ration for wild rats and method*

Twelve captured wild rats (*Rattus norvegicus*) are individually caged and afforded access to a medicated ration containing 0.1% by weight of 3-chloro-1,2-propanediol. The average amount of ration consumed overnight is found to be about 22 gm., showing dosage of about 22 mg. of the essential active ingredient. Six days later the rats are sacrificed and found to have an average body weight of about 300 gm. This weight indicates that the average dosage of active ingredient is about 73 mg. per kilo. Ten of the twelve rats are found to have the epididymal lesions characteristic of irreversible infertility.

EXAMPLE 15

*Solid rat ration and methods*

A rat ration containing the usual dietary ingredients, protein, carbohydrate, fat, minerals and vitamins is medicated by incorporating therein a sufficient quantity of 3-chloro-1,2-propanediol to provide a concentration of about 0.1% by weight. This ration is placed in and about a grain storage area where wild rats are observed and considerable loss of grain occurs. There follows a gradual reduction in rat population in the area, such that contamination and loss of grain are both significantly reduced.

EXAMPLE 16

*Fertility and libido of adult male rats treated once or twice orally with aqueous pharmaceutical preparation*

Materials and methods: Young adult male rats (350 ± 25 gm.) receive orally 30 mg./rat of 3-chloro-1,2-propanediol either once or on two consecutive days. The active ingredient is administered by gavage of an aqueous preparation. These males are caged separately for approximately three months and then given the opportunity to mate with an estrous female. Those males which fail to mate on the first opportunity are exposed to a second estrous female on the following night. All males are then killed and examined for epididymal lesions. The females are examined for vaginal plugs and sperm in the vagina; and pregnancy is determined by autopsy on the 10th day after the day of finding vaginal plugs.

RESULTS

| Rat No. | Dosage, milligrams | Mating | Sperm | Vaginal plugs | Epididymal lesions | Female pregnant |
|---|---|---|---|---|---|---|
| 1A | 2×30 | Yes | No | Yes | Yes | No. |
| 2A | 2×30 | DNM | | | Yes | |
| 3A | 2×30 | Yes | No | Yes | Yes | No. |
| 1B | 30 | Yes | No | Yes | Yes | No. |
| 2B | 30 | Yes | No | Yes | Yes | No. |
| 3B | 30 | Yes | No | Yes | Yes | No. |
| 4B | 30 | DNM | | | Yes | |

NOTE.—DNM=Did not mate.

Although not necessary to the several embodiments heretofore described, other active ingredients can be included in the preparations and methods. The amounts of such ingredients are determined in reference to their known biological and physiological properties. Such ingredients are anti-coagulant-rodenticides, e.g., 2-diphenyl-acetyl-1,3-indandione, and its salts (U.S. Pat. 2,900,302), 3 - (α - ethylbenzyl)-4-hydroxycoumarin and its chloro derivative, 3 - (α - ethyl - p - chlorobenzyl)-4-hydroxycoumarin, 3 - (α - acetonyl-4-chlorobenzyl)-4-hydroxycoumarin, 3-(α-acetonylfurfuryl)-4-hydroxycoumarin, 2-pivalyl-1,3-indandione, calcium salt of 2-isovaleryl-1,3-indandione and the like; stomach poisons, e.g., sodium fluoroacetate, α-naphthylthiourea, thallium sulfate, zinc phosphide, arsenic trioxide, strychnine, and red squill; estrogens, e.g., mestranol, ethinyl estradiol, diethylstilbestrol, and chlorotrianisene; androgens, e.g., fluoxymestrone and methyltestosterone; and progestogens, e.g., melengestrol acetate, ethisterone, medroxyprogesterone acetate, and norethindrone. Depending upon locale, e.g., farm, urban, business, and type of pest to be controlled and desired effect thereupon, these additional active ingredients are beneficial in controlling vertebrate pests, e.g., such as rats, voles, nutria, squirrels, gophers, gerbils, dogs, hares and coyotes. In rat control the use of the additional anti-coagulant active ingredient reduces the population sooner than expected. Similar beneficial effects attend the use of the additional stomach poison active ingredient.

We claim:

1. A method of reversibly preventing impregnation by sexually mature male animals which consists essentially of administering systemically to said animals an effective amount for preventing impregnation of a compound of the formula

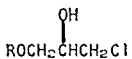

wherein R is selected from the group consisting of hydrogen; an acyl radical of a hydrocarbon carboxylic acid of 1 to 18 carbon atoms, inclusive; and an alkyl radical of 1 to 8 carbon atoms, inclusive.

2. The method of claim 1 wherein the compound is 3-chloro-1,2-propanediol.

3. A method of causing fertile male rats to have sterile matings with fertile female rats which consists essentially of supplying to said male rats, in locales available to and frequented by said rats, a ration supplying per day at least about 35 mg. per kilogram of body weight of said rats of a compound of the formula

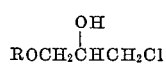

wherein R is selected from the group consisting of hydrogen, an acyl radical of a hydrocarbon carboxylic acid of 1 to 18 carbon atoms, inclusive; and an alkyl radical of 1 to 8 carbon atoms, inclusive, whereby epididymal lesions and irreversible infertility occurs to said male rats.

4. The method of claim 3 wherein the compound is 3-chloro-1,2-propanediol.

5. The method of claim 3 wherein the ration contains from about 0.05% to about 0.5% by weight of said compound.

References Cited

UNITED STATES PATENTS 2,155,949  4/1939  Maier-Bode et al. _____ 167—48

OTHER REFERENCES

Borkovec: Insect Chemosterilants, 1966, page 41.

ALBERT T. MEYERS, Primary Examiner

A. J. ROBINSON, Assistant Examiner

U.S. Cl. X.R.

424—308, 311, 312, 314, 342